United States Patent
Park

(10) Patent No.: US 7,369,344 B2
(45) Date of Patent: May 6, 2008

(54) METHOD AND APPARATUS FOR COMPENSATING FOR OFFSET OF DISK DRIVE

(75) Inventor: Seung Chul Park, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 138 days.

(21) Appl. No.: 11/445,153

(22) Filed: Jun. 2, 2006

(65) Prior Publication Data

US 2007/0091749 A1    Apr. 26, 2007

(30) Foreign Application Priority Data

Oct. 26, 2005    (KR) .................. 10-2005-0101355

(51) Int. Cl.
G11B 19/247    (2006.01)
G11B 19/04    (2006.01)

(52) U.S. Cl. ..................... 360/73.03; 360/60
(58) Field of Classification Search ............. None
See application file for complete search history.

(56) References Cited

U.S. PATENT DOCUMENTS 5,379,166 A    1/1995    Tsukada et al.
5,892,635 A    4/1999    Morita
5,936,787 A *    8/1999    Ohmi .................. 360/73.03
6,285,522 B1 *    9/2001    McKenzie et al. ............ 360/60
6,583,944 B1 *    6/2003    Wilson et al. ........... 360/73.03
6,972,540 B1 *    12/2005    Wang et al. ................. 360/75
2005/0201234 A1 *    9/2005    Hanks ..................... 369/47.38
2005/0201236 A1 *    9/2005    Jun ......................... 369/53.14
2006/0012912 A1 *    1/2006    Jeong ........................ 360/75

FOREIGN PATENT DOCUMENTS

JP    02-79202    3/1990

* cited by examiner

Primary Examiner—Tan Dinh
Assistant Examiner—James L Habermehl
(74) Attorney, Agent, or Firm—Staas & Halsey LLP

(57) ABSTRACT

A method for compensating an offset of a disk drive which is accomplished by recording actual spin jitter while performing track following, extracting a DC component from a recorded actual spin jitter, and compensating for an offset of a spindle speed based on an extracted DC component.

19 Claims, 8 Drawing Sheets

METHOD AND APPARATUS FOR COMPENSATING FOR OFFSET OF DISK DRIVE

CROSS-REFERENCE TO RELATED APPLICATIONS

This application claims the benefit of Korean Patent Application No. 10-2005-0101355, filed on Oct. 26, 2005, in the Korean Intellectual Property Office, the disclosure of which is incorporated herein in its entirety by reference.

BACKGROUND OF THE INVENTION

1. Field of the Invention

The present invention relates to a disk drive, and more particularly, to a method and apparatus for compensating offset of a disk drive.

2. Description of the Related Art

In general, a hard disk drive reproduces data recorded on a disk or writes user data to a disk using a magnetic head. As the hard disk drive has high capacity and high density while being made compact, BPI (bit per inch) that is the density of data in a rotational direction of the disk and TPI (track per inch) that is the density of data in a radial direction of the disk increase so that a more accurate control mechanism is needed.

The drive repeats track following and search operations to store information. In doing so, a spindle motor is rotated at a constant speed to lift the head to a predetermined height above the disk. For an embedded method, position information needed for the track following and search operations is written to the disk in a servo pattern having a period corresponding to a servo sampling frequency. The servo pattern is written by a servo writer. In some cases, a servo copy process is provided to obtain a high quality servo pattern signal.

The servo writer theoretically employs a motor speed control system that is the same as that for the spindle motor. A motor speed control circuit used for the servo writer and a PCBA circuit used for an actual drive may be different in a device value and DAC offset for a motor. Accordingly, the rotation speed of the spindle motor can vary by a few r.p.m., compared to a designed rotation speed.

However, in a conventional offset compensation method. In order to prevent reproduction failure due to a change of a frequency during reproduction, while a change in the speed of a motor during writing data to a disk is continuously monitored, a writing operation is allowed only when the speed of a motor has a value within a particular range from a target speed. Thus, since the conventional offset compensation method allows writing only when spin jitter exists within a writing operation allowance standard, the writing performance of a drive is deteriorated in the process of considering the offset.

SUMMARY OF THE INVENTION

To solve the above and/or other problems, the present invention provides a method for compensating for offset of a disk drive by removing a DC component of spin jitter generated due to the existence of offset in the rotation speed of a motor, thus providing writing stability and simultaneously improving writing performance.

The present invention provides an apparatus for compensating for offset of a disk drive which employs the above method.

According to an aspect of the present invention, a method for compensating an offset of a disk drive is accomplished by recording actual spin jitter while performing track following, extracting a DC component from a recorded actual spin jitter, and compensating for an offset of a spindle speed based on an extracted DC component.

According to another aspect of the present invention, an apparatus for compensating for an offset of a disk drive including a spindle motor to rotate a disk and a track following portion to control tracking following of a head, includes a memory storing actual spin jitter of the drive, a spin jitter recording portion storing actual spin jitter generated during the tracking following of the disk in the memory, a DC term extraction portion extracting a DC component from the actual spin jitter recorded in the memory, and an offset compensation execution portion performing an operation of compensating for the offset of a spindle speed based on an extracted DC component.

To remove the DC component, the target rotation speed of the spindle motor may be increased as fast as the rotation speed of the spindle motor corresponding to the spin jitter that is calculated.

By determining whether to allow recording using the virtual spin jitter where the DC component is removed, an effect similar to a case in which the target rotation speed of the spindle motor is increased may be obtained.

A computer readable recording medium stores a program to execute the above method on a computer.

Additional aspects and/or advantages of the invention will be set forth in part in the description which follows and, in part, will be apparent from the description, or may be learned by practice of the invention.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE PREFERRED EMBODIMENTS

Figure 1:
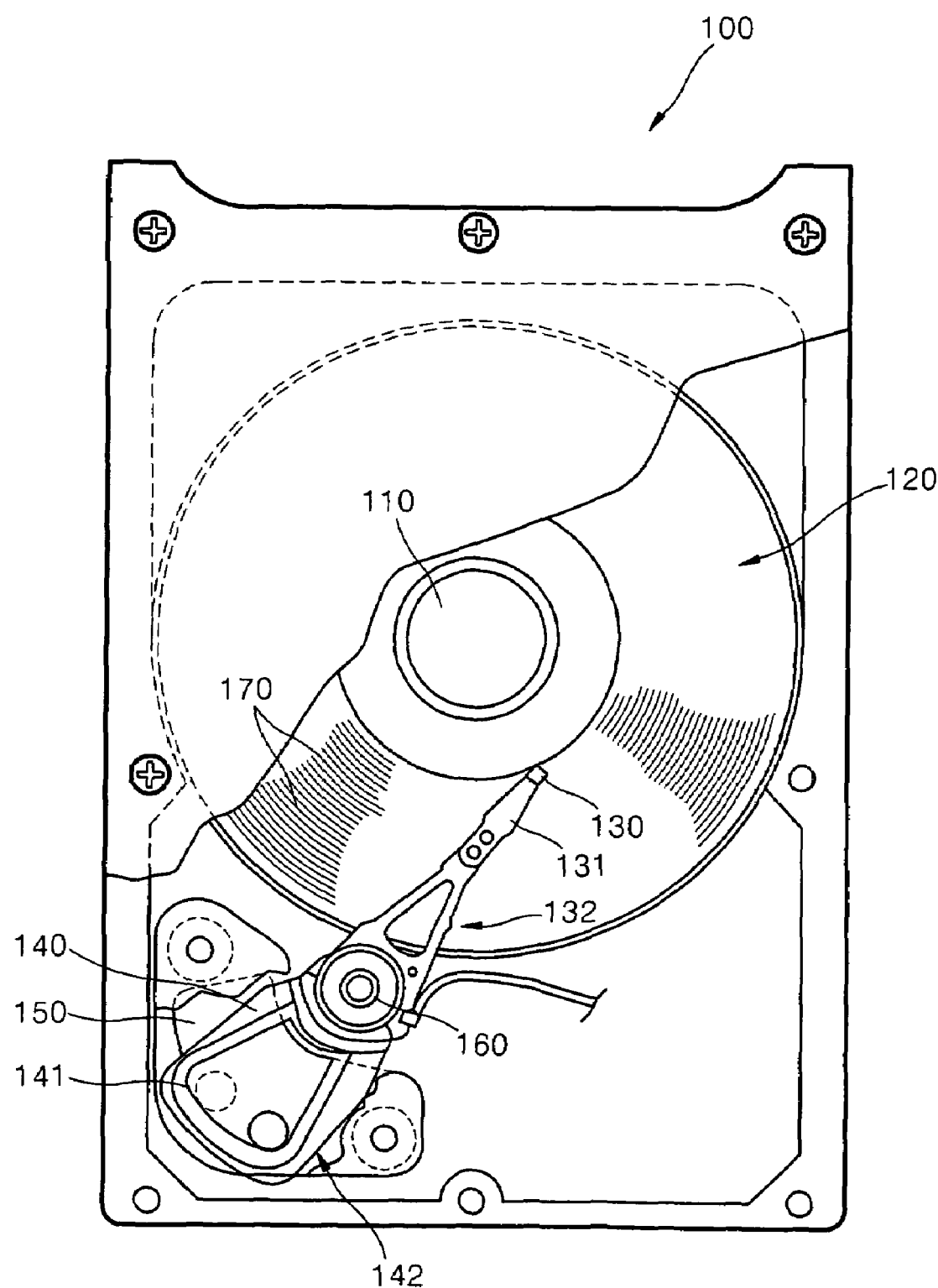
FIG. 1 is a view showing the configuration of a hard disk drive employing the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Referring to FIG. 1, a hard disk drive 100 according to an embodiment of the present invention includes at least one magnetic disk 120 that is rotated by a spindle motor 110. The drive 100 includes a head 130 located close to a surface of the disk 120.

The head 130 detects a magnetic field of each disk 120 and magnetizes the surface of the disk 120 so as to read information from or write information to the disk 120 that is rotating. The head 130 is typically coupled to the surface of each disk 120. While a single head is shown in FIG. 1, it must be understood that the head 130 consists of a writing head to magnetize the disk 120 and a read head separately provided to detect the magnetic field of the disk 120. The read head is formed of a magneto-resistive (MR) device.

The head 130 can be integrated with a slider 131. The slider 131 generates an air bearing between the head 130 and the surface of the disk 120. The slider 131 is coupled to a head gimbal assembly 132. The head gimbal assembly 132 is attached to an actuator arm 140 having a voice coil 141. The voice coil 141 is located adjacent to a magnetic assembly 150 which specifies a voice coil motor (VCM) 142. Current applied to the voice coil 141 causes torque to rotate the actuator arm 140 with respect to a bearing assembly 160. As the actuator arm 140 rotates, the head 130 is moved across the surface of the disk 120.

Information is typically stored in a circular track of the disk 120. Each track 170 generally includes a plurality of sectors. Each sector includes a data field and an identification field. The identification field is formed of a grey code that identifies the sector and the track (cylinder). The head 130 is moved across the surface of the disk 120 to read or write information of the next track.

Figure 2:
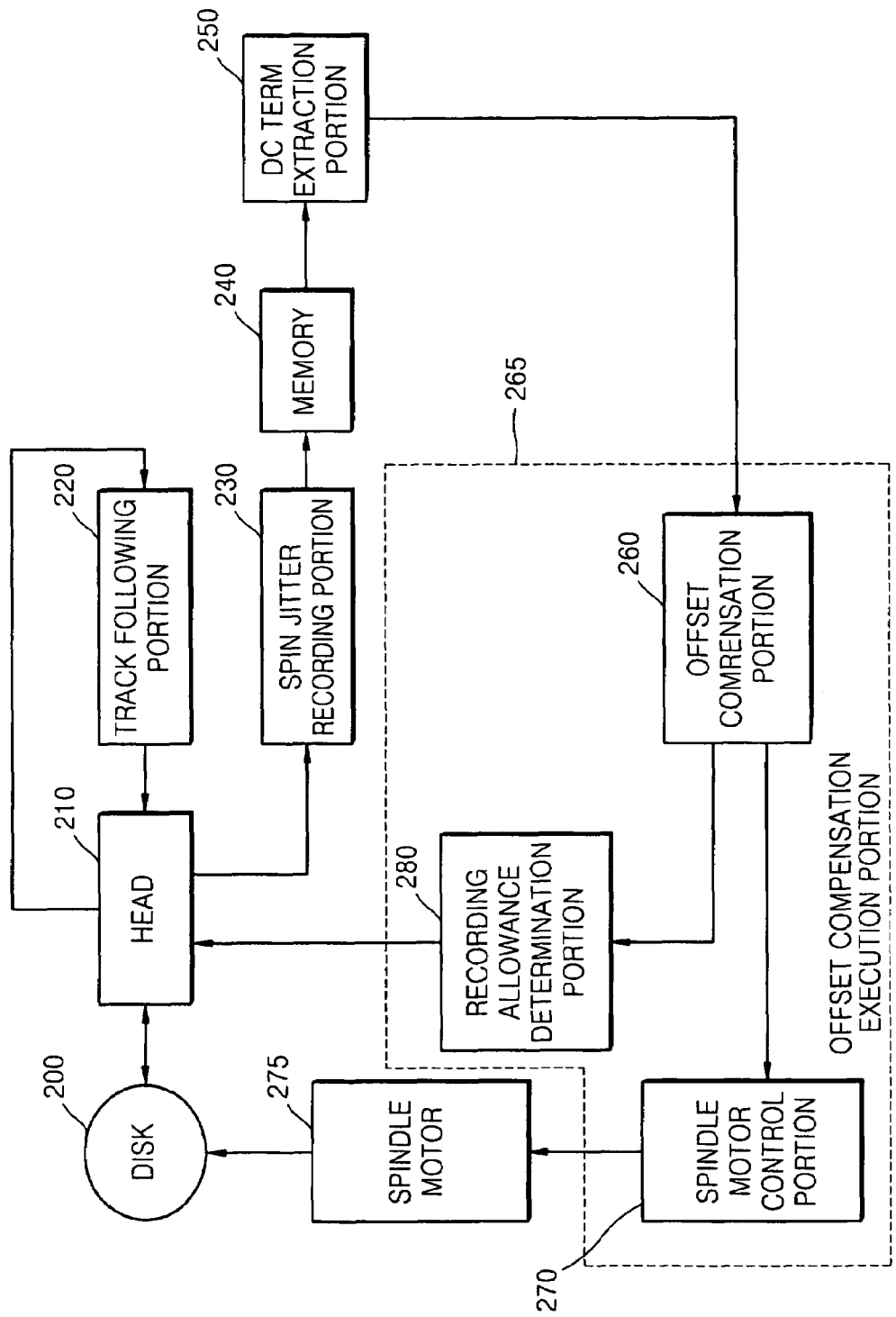
FIG. 2 is a block diagram of an offset compensation apparatus according to an embodiment of the present invention.

FIG. 2 is a block diagram of an offset compensation apparatus according to an embodiment of the present invention. Referring to FIG. 2, as a head 210 magnetizes a surface of a disk 200, the disk 200 stores information. The information stored on the surface of the disk 200 is detected by the head 210. The head 210 is lifted to a specified height over the surface of the disk 200 to perform write/read operations.

A track following portion 220 moves the head 210 to a target track on the disk 200 and performs a feedback operation using a position error signal PES of the head 210 to maintain the position of the head 210 around the target track.

A spin jitter recording portion 230 stores in a memory 240 actual spin jitter that is generated during the disk track following operation. The spin jitter is defined as an amount of a change in linear velocity within the same track when the disk 200 rotates at a constant speed. A spin jitter value is obtained by measuring time for each section where a servo sync signal is generated during the track following of the disk and calculating the amount of a change in linear velocity based on the measured time. For example, the spin jitter can be defined as time from a point when the preceding servo SAM is detected to a point when the present servo SAM is detected during the disk track following operation. The spin jitter recording portion 230 can be set to record actual spin jitter generated during one turn of the disk 200.

The memory 240 stores the actual spin jitter of a drive measured by the spin jitter recording portion 230. The memory 240 can be formed of a non-volatile memory device storing preceding spin jitter to compensate for spindle offset generated during the next track following and a volatile memory device to temporarily store spin jitter generated during the present track following.

A DC term extraction portion 250 extracts a DC component from the actual spin jitter recorded in the memory 240. The DC term extraction portion 250 can outputs as the DC component an average of the actual spin jitter recorded in the memory 240. The average of the actual spin jitter may be an average of a spin jitter value recorded during the one turn.

An offset compensation execution portion 265 performs an operation to compensate an offset in the speed of a spindle using the DC component extracted by the DC term extraction portion 250. The offset compensation execution portion 265 includes an offset compensation portion 260, a spindle motor control portion 270, and a recording allowance determination portion 280.

The offset compensation portion 260 calculates a spindle speed value corresponding to the DC component extracted by the DC term extraction portion 250 and changes the rotation speed of the spindle motor to the spindle speed value calculated by the offset compensation portion 260. A spindle motor 275 changes the rotation speed of the disk 200 by the control of the spindle motor control portion 270, for example, according to the application of control current corresponding to a target rotation speed. Also, the offset compensation portion 260 can calculate virtual spin jitter by deducting the extracted DC component from the recorded actual spin jitter. The recording allowance determination portion 280 determines whether to allow recording of a disk drive based on the virtual spin jitter calculated by the offset compensation portion 260, not the actually measured spin jitter.

Figure 3:
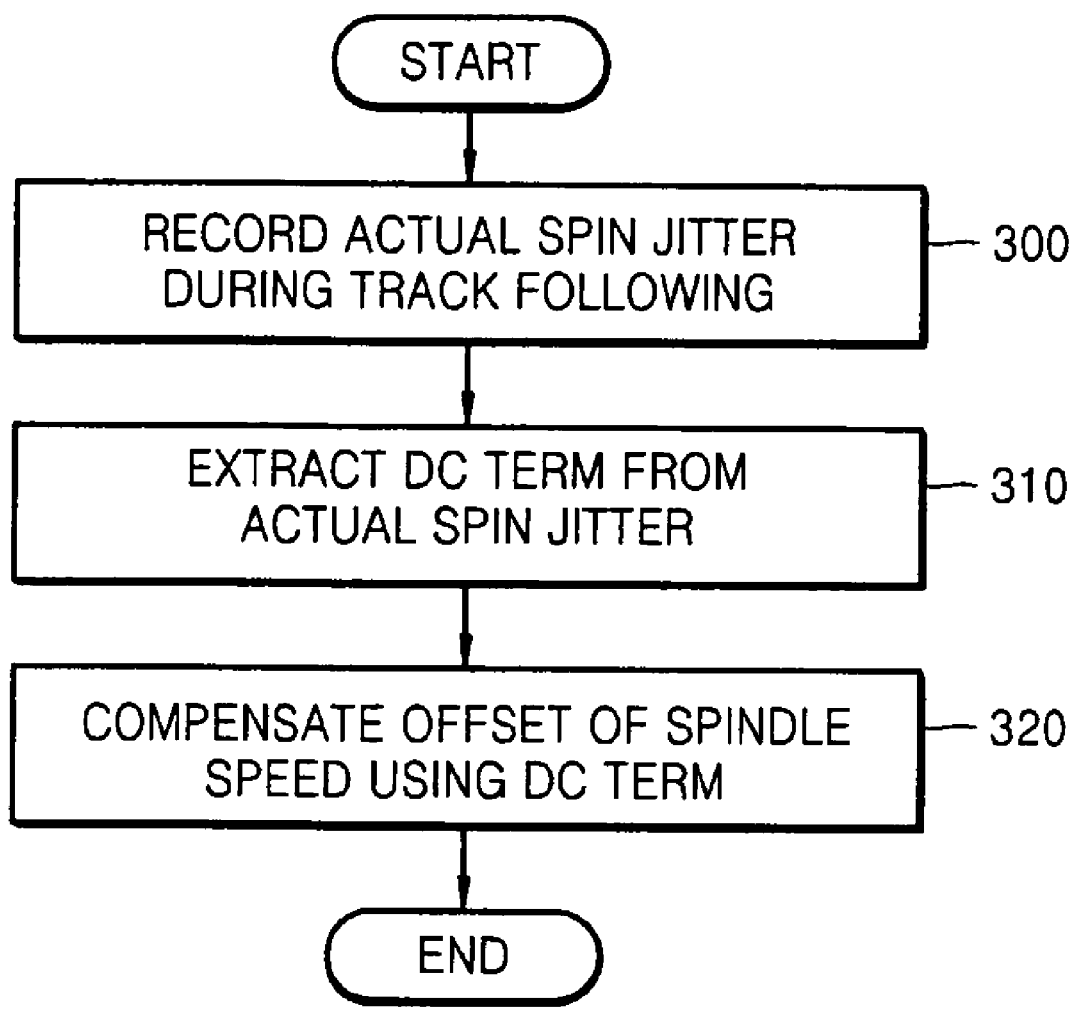
FIG. 3 is a flowchart for explaining an offset compensation method according to an embodiment of the present invention.

FIG. 3 is a flowchart for explaining an offset compensation method according to an embodiment of the present invention. Referring to FIG. 3, actual spin jitter is recorded during the track following (Operation 300). The spin jitter consists of an AC component that changes every moment and a DC component generated due to a difference between the rotation speed of a motor or a servo writer and the rotation speed of a motor of an actual drive.

A DC term is extracted from the recorded actual spin jitter (operation 310). In this operation, the DC component is extracted from the actual spin jitter. The DC component can be obtained using an average of a spin jitter value during one turn of a disk.

An offset of a spindle motor is compensated using the extracted DC term (Operation 320). In the operation, the DC component is removed through a changed in the speed of a spindle motor by adding or deducting the spindle speed equivalent to the DC component to or from the present spindle speed.

In the operation, assuming that the DC component does not exit in the actual spin jitter, the AC component only is used as a standard to determine the allowance of recording. That is, when an AC component value is within a spin jitter value for allowing recording, a method for recording data to a disk can be used.

Figure 4A:
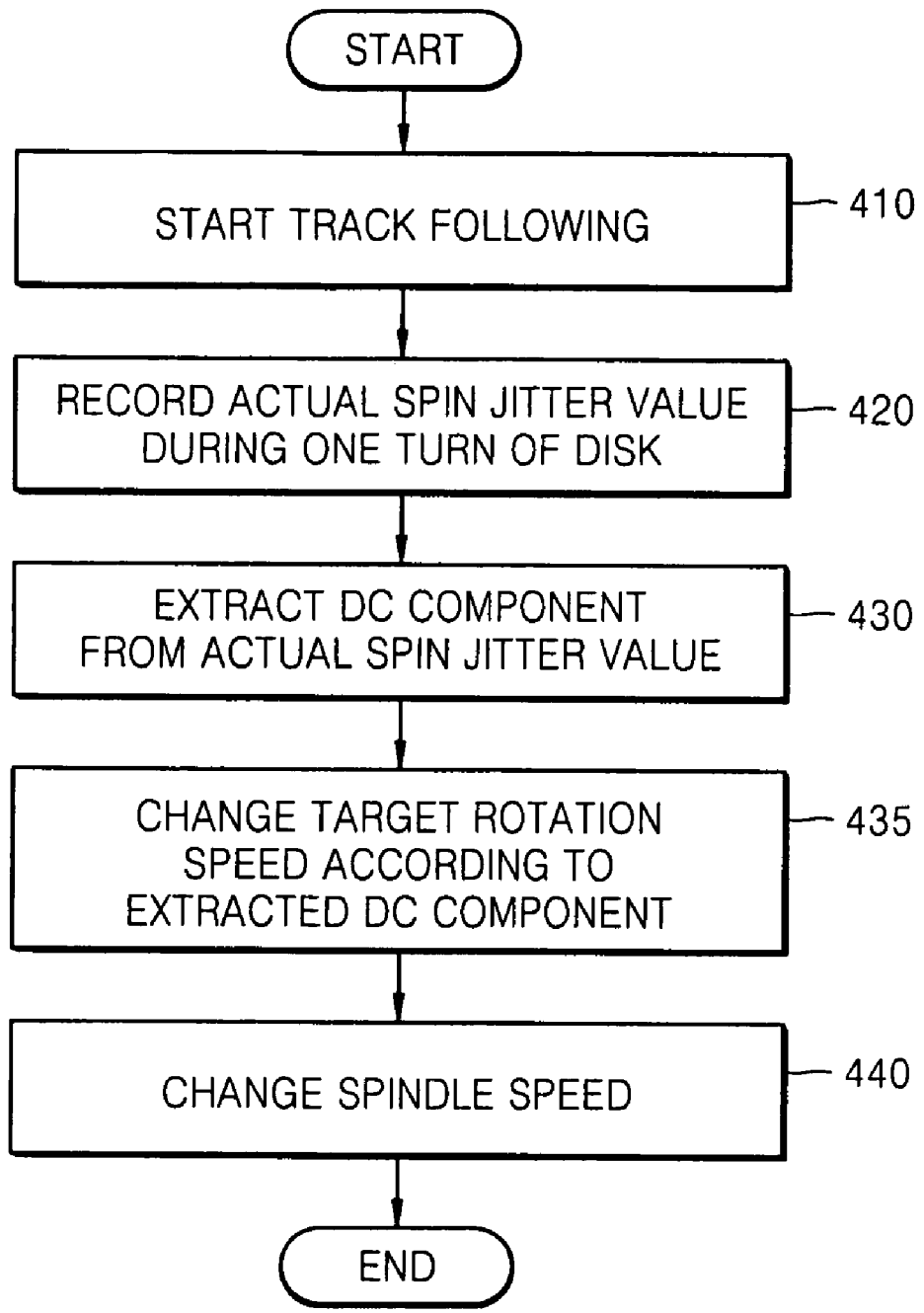
FIG. 4A is a flow chart for explaining an offset compensation method according to another embodiment of the present invention.

FIG. 4A is a flow chart for explaining an offset compensation method according to another embodiment of the present invention. Referring to FIG. 4A, track following is started (Operation 410). The measurement of the spin jitter value is possible based on an assumption of following a certain track.

An actual spin jitter value during one turn of a disk is recorded (Operation 420). The spin jitter consists of an AC component that changes every moment and a DC component generated due to a difference between the rotation speed of a motor or a servo writer and the rotation speed of a motor of an actual drive. For example, the spindle jitter value recording is to record spin jitter by measuring time from the preceding servo SAM detection point to a present SAM detection point during the disk track following. The spin jitter value recording can be recording of the spin jitter value during one or more turn of a disk or less than one turn of a disk.

When the actual spin jitter is recorded, the DC component is extracted from the actual spin jitter value (Operation 430). The DC component can be obtained using an average of a spin jitter value during one turn of a disk. When the DC component is extracted, the target rotation speed is changed according to the extracted DC component (Operation 435). For example, when the extracted DC component indicates a positive value, the target rotation speed is set high. When the extracted DC component indicates a negative value, the target rotation speed is set low.

The rotation speed of a spindle motor is changed to a changed target rotation speed (Operation 440). In the operation, the rotation speed of the spindle motor is changed in a method of changing control current applied to the spindle motor. When the rotation speed of the spindle motor is changed so that the DC component of the spin jitter is not detected, the amplitude of the spin jitter based on the zero point is decreased as much as the amount of the undetected DC component. Since recording is allowed when the spin jitter is generated within a specified value in the drive, by changing the rotation speed of the spindle motor to remove the DC component, a greater margin for accurate recording can be obtained. Also, as the margin increases, the number of cases for allowing recording increases so that the recording performance is improved.

Figure 4B:
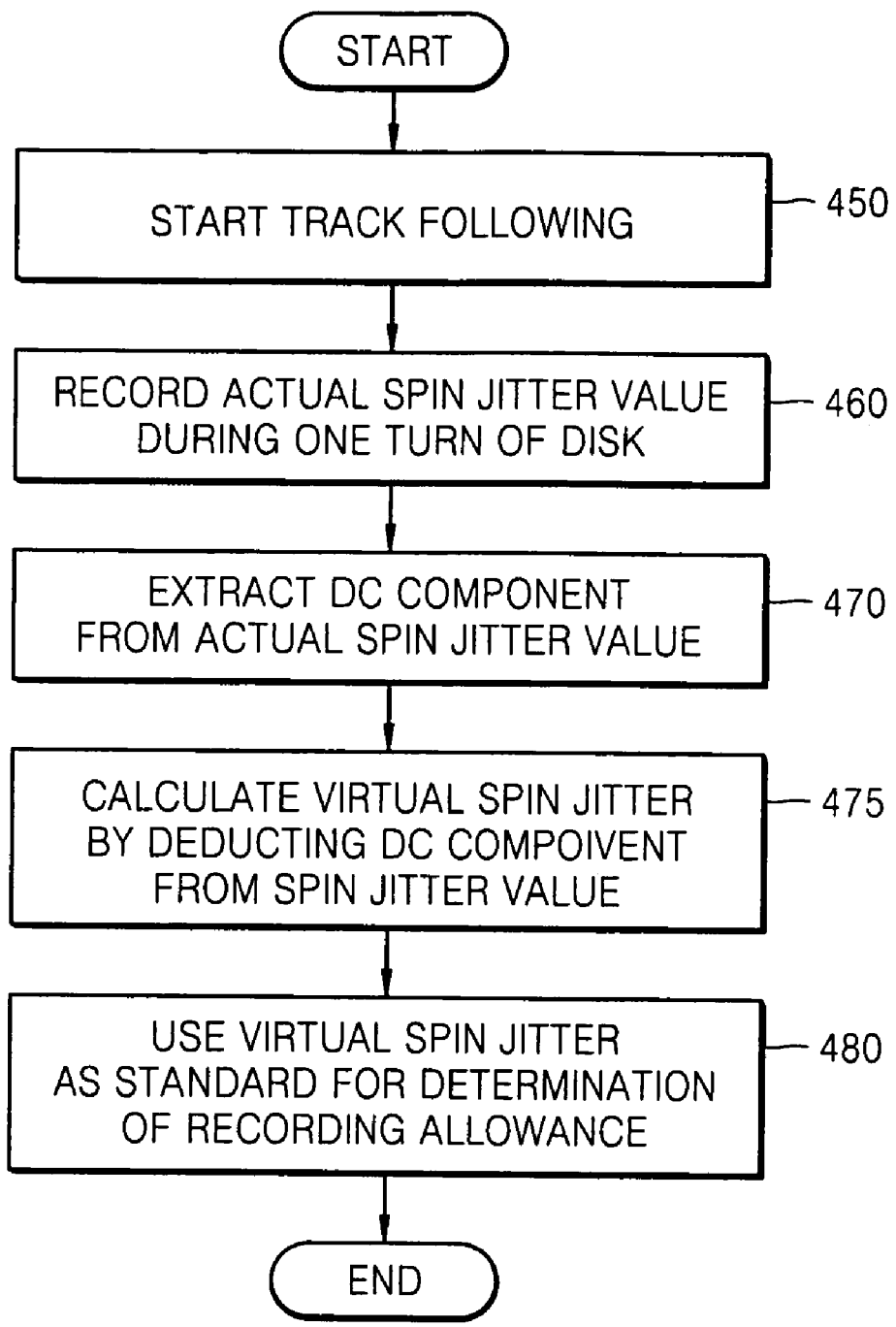
FIG. 4B is a flow chart for explaining an offset compensation method according to yet another embodiment of the present invention.

FIG. 4B is a flow chart for explaining an offset compensation method according to yet another embodiment of the present invention. Referring to FIG. 4B, track following is started (Operation 450). An actual spin jitter value during one turn of a disk is recorded (Operation 460). For example, the spindle jitter value recording is to record spin jitter by measuring time from the preceding servo SAM detection point to a present SAM detection point during the disk track following.

When the actual spin jitter is recorded, a DC component is extracted from the actual spin jitter value (Operation 470). The spin jitter consists of an AC component that changes every moment and a DC component generated due to a difference between the rotation speed of a motor or a servo writer and the rotation speed of a motor of an actual drive. The DC component can be obtained using an average of a spin jitter value during one turn of a disk.

When the DC component is extracted, a virtual spin jitter is calculated by deducting the extracted DC component from the actual spin jitter (Operation 475). The virtual spin jitter can be obtained by deducting the DC component from the actual spin jitter measured after the DC component is extracted, instead of the previously recorded spin jitter. Accordingly, the drive system can recognize the virtual spin jitter as an actually measured spin jitter.

The virtual spin jitter is used as a standard to determine the allowance of recording (Operation 480). Since recording is allowed only when the spin jitter is generated within a specified value in the drive, by using the virtual spin jitter as a standard to determine the allowance of recording, a greater margin for accurate recording can be obtained. Also, as the margin increases, the number of cases for allowing recording increases so that the recording performance is improved.

Figure 5A:
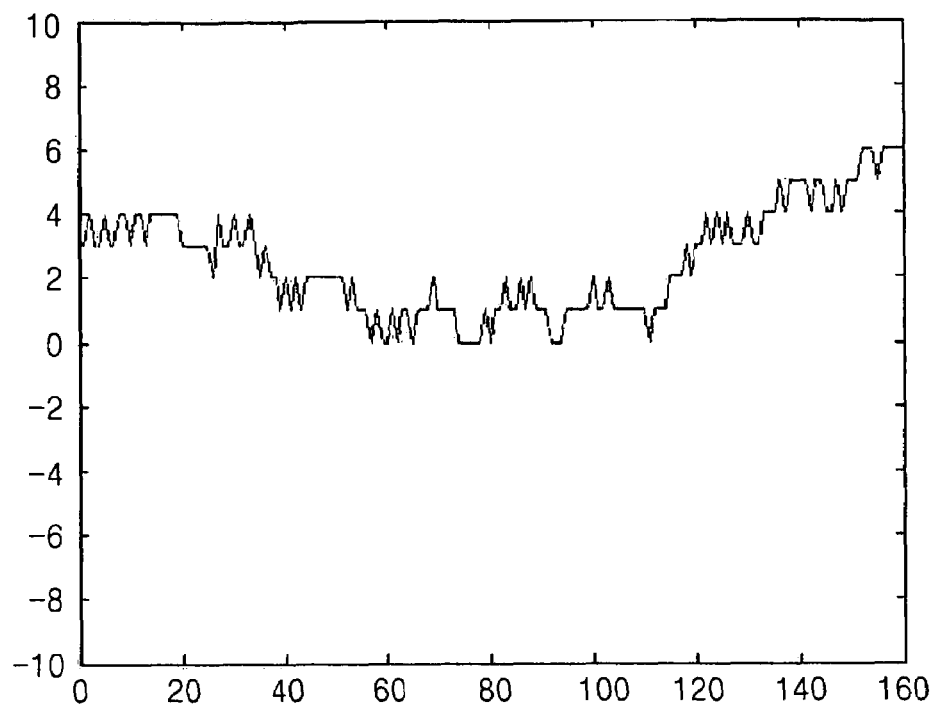
FIGS. 5A though 5C are graphs showing the actual spin jitter measured before the offset compensation method of FIG. 3 is applied.

FIGS. 5A though 5C are graphs showing the actual spin jitter measured before the offset compensation method of FIG. 3 is applied. In each of the graphs, a horizontal axis denotes a servo wedge number while a vertical axis denotes a spin jitter value.

Figure 5B:
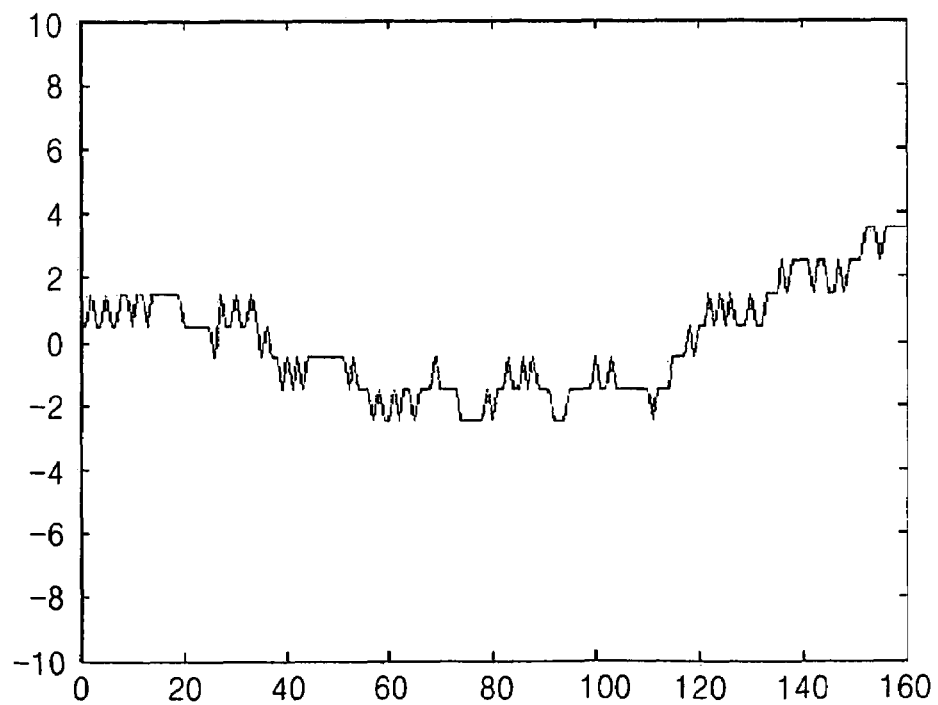
Figure 5C:
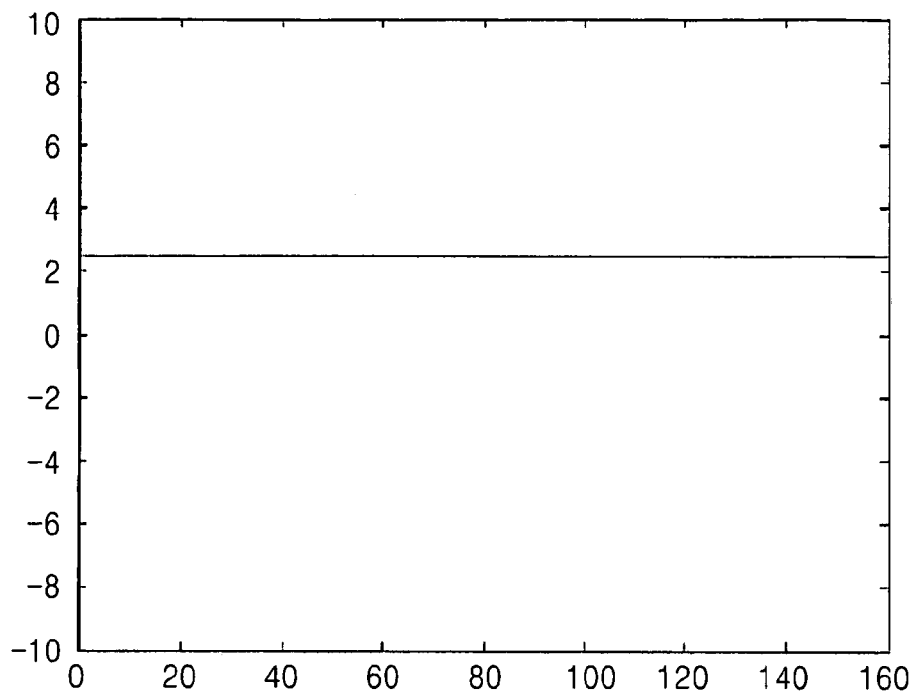

FIG. 5A is a graph showing the actual spin jitter measured in the above-described spin jitter measuring method. FIG. 5B is a graph showing the AC component extracted from the actual spin jitter of FIG. 5A. FIG. 5C is a graph showing the DC component extracted from the actual spin jitter of FIG. 5A. As shown in FIG. 5C, the DC component generated because an offset exists in the speeds of the servo writer and the motor of the drive indicates a positive number "2".

To remove a DC component 2 according to the first embodiment, the rotation speed of a spindle motor corresponding to a spin jitter 2 is calculated and the target rotation speed of a spindle motor is increased as much as the rotation speed. When the allowance of recording is determined using the virtual spin jitter where the DC component 2 is removed according to another embodiment, an effect can be obtained which is similar to a case in which the target rotation speed of a spindle motor is increased.

Figure 6A:
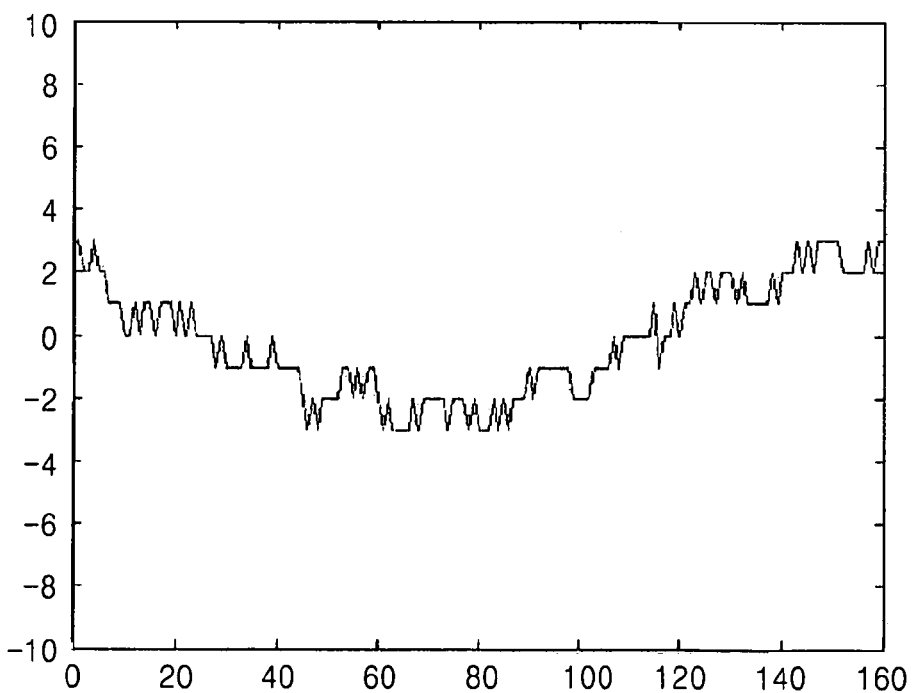
FIGS. 6A through 6C are graphs showing the actual spin jitter measured after the offset compensation method of FIG. 3 is applied.
Figure 6B:
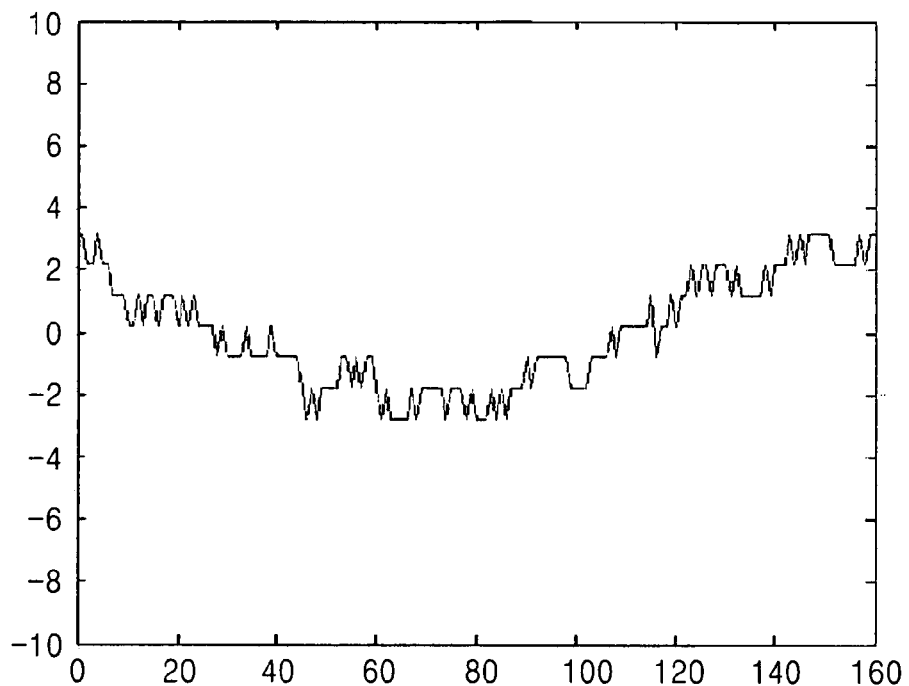
Figure 6C:
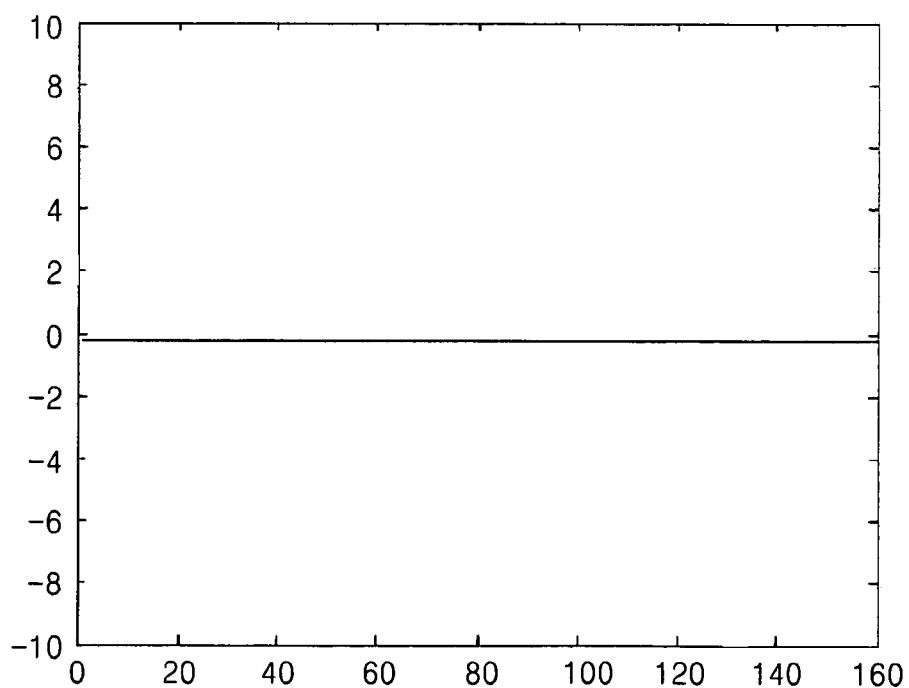

FIGS. 6A through 6C are graphs showing the actual spin jitter measured after the offset compensation method of FIG. 3 is applied. FIG. 6A is a graph showing the actual spin jitter measured in the above-described spin jitter measurement method. It is noted that the center axis of the graph of FIG. 6A is lower than that of the graph of FIG. 5A.

FIG. 6B is a graph showing the AC component extracted from the actual spin jitter of FIG. 6A, which is almost similar to that of FIG. 6A. This is because the DC component is very close to "0" as shown in FIG. 6C. The graph corresponds to the actual spin jitter measured after the present invention is applied according to the first embodiment and to the virtual spin jitter calculated after the present invention is applied according to the second embodiment.

As described above, according to the present invention, by extracting the DC component from the actual spin jitter during the track following and performing an offset corresponding to the extracted DC component, the recording margin of the drive with respect to the spin jitter is increased. Also, the recording stability of the disk drive is obtained and simultaneously recording performance can be improved.

The method for compensating an offset of a disk drive according to the present invention can be recorded in a computer readable recording medium which can execute a program on a computer.

The present invention can be executed through software. When being executed through software, the constituent elements of the present invention are code segments which execute necessary jobs. The program or code segments are stored in a processor readable medium or transmitted by a computer data signal combined with a carrier wave in a transmission medium or communications network.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for compensating an offset of a disk drive comprising:
    recording actual spin jitter while performing track following;
    extracting a DC component from a recorded actual spin jitter; and
    compensating for an offset of a spindle speed based on an extracted DC component.

2. The method of claim 1, wherein the compensating of the offset of the spindle speed comprises:
   calculating a spindle speed value corresponding to the extracted DC component; and
   changing a rotation speed of a spindle motor to a calculated spindle speed value.

3. The method of claim 1, wherein the compensating of the offset of the spindle speed comprises:
   calculating a virtual spin jitter by deducting the extracted DC component from the recorded actual spin jitter; and
   determining whether to allow recording of a disk drive based on the virtual spin jitter.

4. The method of claim 1, wherein, in the recording of the actual spin jitter, the actual spin jitter generated during one turn of a disk is recorded.

5. The method of claim 1, wherein, in the extracting of the DC component, an average of the recorded actual spin jitter is output as the DC component.

6. The method of claim 1, wherein the actual spin jitter is time from a preceding servo SAM detection point to a present SAM detection point during disk track following.

7. An apparatus for compensating for an offset of a disk drive including a spindle motor to rotate a disk and a track following portion to control tracking following of a head, the apparatus comprising:
   a memory storing actual spin jitter of the drive;
   a spin jitter recording portion storing actual spin jitter generated during the tracking following of the disk in the memory;
   a DC term extraction portion extracting a DC component from the actual spin jitter recorded in the memory; and
   an offset compensation execution portion performing an operation of compensating for the offset of a spindle speed based on an extracted DC component.

8. The apparatus of claim 7, wherein the offset compensation execution portion comprises:
   an offset compensation portion calculating a spindle speed value corresponding to the DC component extracted from the DC extraction portion; and
   a spindle motor control portion changing a rotation speed of the spindle motor to a spindle speed value calculated by the offset compensation portion.

9. The apparatus of claim 7, wherein the offset compensation execution portion comprises:
   an offset compensation portion calculating virtual spin jitter by deducting the extracted DC component from the recorded actual spin jitter; and
   a recording allowance determination portion determining whether to allow recording of the disk drive based on the virtual spin jitter calculated by the offset compensation portion.

10. The apparatus of claim 7, wherein the spin jitter recording portion records the actual spin jitter generated during one turn of the disk.

11. The apparatus of claim 7, wherein the DC term extraction portion outputs an average of the actual spin jitter recorded in the memory as the DC component.

12. The apparatus of claim 7, wherein the actual spin jitter is time from a preceding servo SAM detection point to a present SAM detection point during disk track following.

13. The apparatus of claim 7, wherein the memory comprises:
   a non-volatile memory device storing a preceding spin jitter to compensate for a spindle offset during next track following; and
   a volatile memory device temporarily storing spin jitter generated during present track following.

14. A computer readable medium including software executed by the computer to compensate for an offset of a disk drive, comprising:
   recording actual spin jitter while performing track following;
   extracting a DC component from a recorded actual spin jitter; and
   compensating for an offset of a spindle speed based on an extracted DC component.

15. The computer readable medium of claim 14, wherein the compensating of the offset of the spindle speed comprises:
   calculating a spindle speed value corresponding to the extracted DC component; and
   changing a rotation speed of a spindle motor to a calculated spindle speed value.

16. The computer readable medium of claim 14, wherein the compensating of the offset of the spindle speed comprises:
   calculating a virtual spin jitter by deducting the extracted DC component from the recorded actual spin jitter; and
   determining whether to allow recording of a disk drive based on the virtual spin jitter.

17. The computer readable medium of claim 14, wherein, in the recording of the actual spin jitter, the actual spin jitter generated during one turn of a disk is recorded.

18. The computer readable medium of claim 14, wherein, in the extracting of the DC component, an average of the recorded actual spin jitter is output as the DC component.

19. The computer readable medium of claim 14, wherein the actual spin jitter is time from a preceding servo SAM detection point to a present SAM detection point during disk track following.

* * * * *